United States Patent Office 2,840,098
Patented June 24, 1958

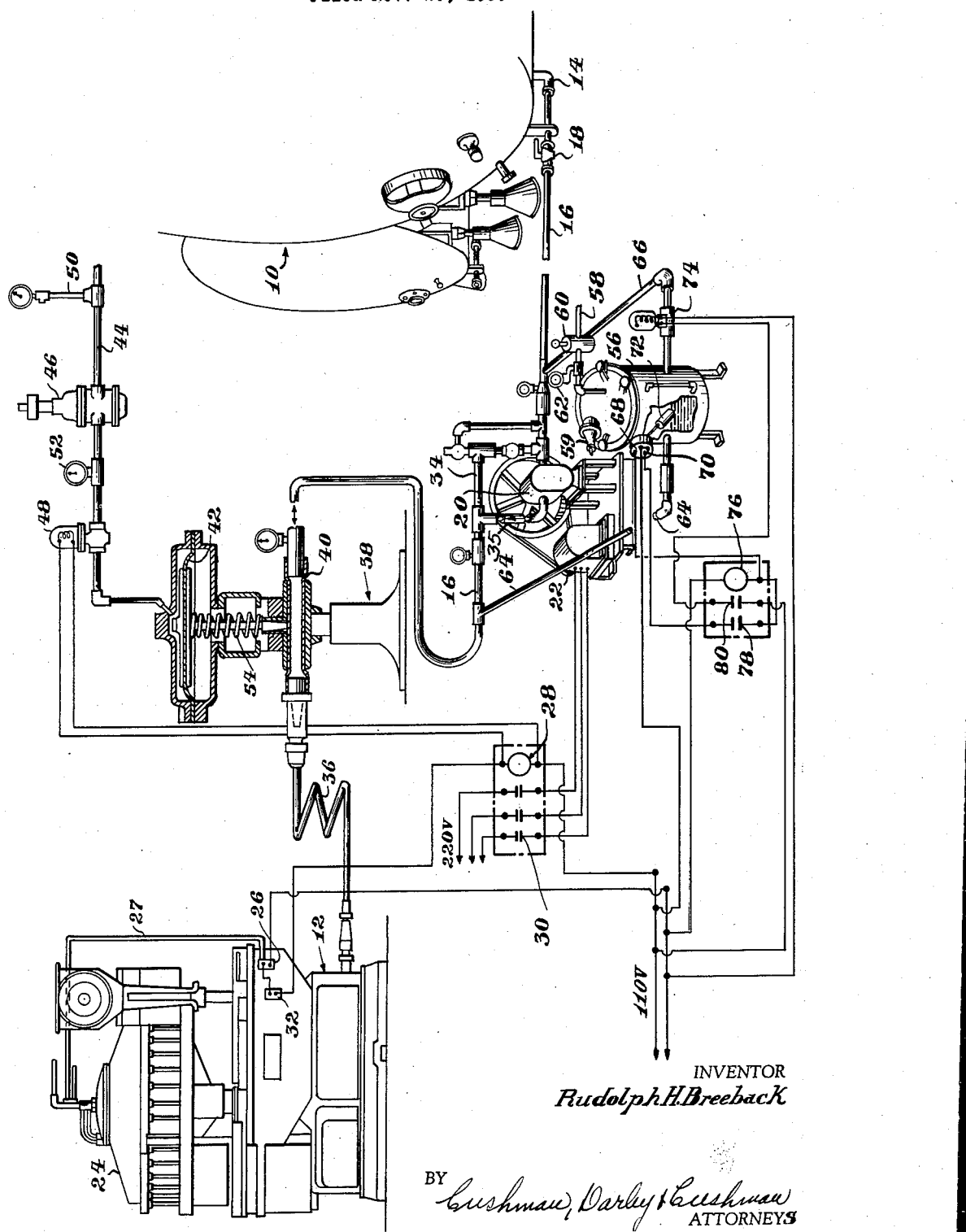

2,840,098

LIQUID FILLING SYSTEM

Rudolph Henry Breeback, Baltimore, Md., assignor to Crown Cork & Seal Company, Inc., Baltimore, Md., a corporation of New York Application November 25, 1953, Serial No. 394,314

15 Claims. (Cl. 137—170.1)

The present invention relates to a filling system and, more particularly, to a system for delivering beer or other carbonated beverages to a filling machine.

Although the system will be described hereinafter as relating to the delivery of beer from government tanks to filling machines in a brewery, it is within the scope of the present invention that other carbonated liquids such as soft drinks or the like could be used with the present system.

Heretofore beer has been delivered from the government tanks, which are the huge vats where the beer is aged and stored, to the filling machines by pipe lines at pressures close to or the same as the pressure in the filling machine reservoir. In certain types of filling machines, it is often desirable to have the beer in the reservoir at a low pressure so that when bottles are continuously filled at high speeds, there will be little or no foaming of the beer.

Therefore, an object of the present invention is the provision of a filling system utilizing a low pressure filling machine with a high pressure beer delivery line from the government storage tank. By providing a high pressure line from the government storage tank to the filling machine and then reducing the pressure just prior to entry in the filling machine, the disadvantage of foaming due to regulation in a low pressure line entering the filler is eliminated.

Another object of the present invention is the provision of a restriction in the beer line from the government tank to the filling machine located adjacent the inlet thereto. The restriction in the beer line will permit a pressure to be built up in the beer line between the restriction and the transfer pump and, thus, materially decrease such foaming as could result from a change of pressure in the beer line caused by the starting and stopping of the transfer pump or by reason of air being entrained in the beer delivery line.

Ancillary to the above object, the provision of a restriction in the beer line adjacent the filling machine and which a pump works against, permits the government tank to be located in the brewery either on the same level as the filler, or below or above the filler because the restriction will establish the necessary pressure head in the beer delivery line ahead of the pump.

In instances where the government tank is located at some remote distance from the filling machine and at a level above the filling machine, the static head of beer caused by the location of the government tank will cause the pressure of the beer in the beer delivery line to vary throughout its length. In other words, the pressure of beer in the beer delivery line at the lowest point thereof will be higher than the pressure of beer in the line adjacent the government tank. A variation of pressure in the beer delivery line is very undesirable as air can be entrapped therein causing foam in the filling machine reservoir or during the filling cycle. Therefore, still another object of the present invention is the provision of a filling system wherein the pressure of beer in the beer delivery line is substantially constant throughout its entire length. The preceding object is accomplished by the provision of a restriction in the beer delivery line adjacent its entry into the filling machine coupled with a pump in the beer delivery line forward of the restriction.

A still further object of the present invention is the provision of means in a filling system for maintaining the pressure of beer in the beer delivery line at the constant value established therein when the transfer pump is inoperative.

A still further object of the present invention is the provision of a filling system with means associated therewith for eliminating a surge pressure of beer in the beer delivery line when the transfer pump is started. Normally when a pump is started the pressure will momentarily increase, causing the beer to be unnecessarily agitated and, thus, foam. The present invention eliminates this condition by providing a surge tank which absorbs any surge in the pressure of beer caused by the starting of the transfer pump.

Another object of the present invention is the provision of a filling system whereby such beer as is bled into the surge tank when there is a momentary increase in pressure of beer in the beer delivery line will be recirculated into the system. By having the surge tank bypass the transfer pump, beer can be returned to the inlet side of the pump and, thus, there will be little or no waste of beer.

Still another object of the present invention is the provision of a filling system having a surge tank which is pressurized by carbon dioxide gas. The use of carbon dioxide gas, such as is used in the reservoir of the filling machine and to counter pressure bottles being filled, prevents the beer received into the surge tank from becoming stale or "flat."

Other objects and advantages of the filling system of the present invention will be apparent from the following specification and the accompanying drawing.

Referring specifically to the drawing, which is a schematic view of the filling system of the present invention, beer is stored in a storage tank 10 and is delivered therefrom through suitable pipes or conduits to a filling machine 12. Storage tank 10 is commonly known in the brewery industry as a government tank and it is usually situated at a remote distance from the filling machine. A brewery may have a number of government tanks 10 in which beer is aged and stored and when the beer is ready for delivery to the filling machine to be bottled, the filling machine is connected to a suitable outlet 14 located in the bottom of the storage tank 10. As previously stated, the storage tank 10 is usually located a remote distance from the filling machine and it may be either located above or below, or on the same level as, the filling machine and, therefore, the system must necessarily be adapted to adequately transfer beer without foaming from tank 10 to filling machine 12 regardless of the location of tank 10. Connected to outlet 14 of tank 10 is a conduit or pipe generally indicated 16 which is known as the beer delivery line. A suitable shut-off valve 18 may be provided in the line adjacent its connection with outlet 14 of tank 10.

Intermediate filling machine 12 and tank 10 is a positive displacement and variable speed pump 20 of the type described in my copending application Serial No. 261,555, filed December 13, 1951, now abandoned, and entitled Filling System. Pump 20 is provided with a one-way check valve 35 in its outlet so that there is no chance of liquid flowing in reverse through the pump when the pump is inoperative. Check valve 35 is provided in the system in a similar manner to that disclosed and illustrated in the previously mentioned pending application. Pump 20 is operated by an electric motor 22 which is controlled in the same manner as disclosed in the previously referred to application. In other words, the level of liquid in a reservoir 24 of filling machine 12 operates a valve (not shown) which permits the gas in the reservoir to flow through a line 27 to actuate a fluid actuated switch 26 which in turn operates a relay generally indicated 28 to close a magnetic starter switch 30 to supply current to the three-phase electric motor 22. Also in the starting circuit and in series with fluid actuated switch 26 is a manually operated switch 32 that is closed when it is desired to begin operation of the system.

Pump 20 is provided with means to protect it when the pipe or conduit 16 becomes clogged on the outlet side thereof and excessive pressure is developed therein. A by-pass 34 is connected between the outlet and inlet of pump 20 similar to the by-pass disclosed in the previously mentioned copending application.

Located in beer delivery line 16 adjacent its inlet into filling machine 12 is a coiled restriction 36 which will establish a substantially constant high pressure in line 16 between the restriction and pump 20 when the pump is operated. The outlet side of restriction 36 is connected to the filling machine 12 at its inlet and delivers beer to the reservoir 24 at a low pressure of between 5 and 12 pounds per square inch. The pressure built up in beer delivery line 16 by the restriction coil against which pump 20 is operating is between 20 and 30 pounds per square inch and, as previously mentioned, is substantially constant during operation. As is now evident, the pressure in the storage tank 10 can be lower than the pressure in the filler as the pressure of beer in the long beer delivery line from the tank to the filling machine will be higher and substantially constant throughout. The pressure is established in beer delivery line 16 at a higher value than is in the filling machine 12 and, thus, there will be no unnecessary foaming due to transfer of the beer through the long delivery line 16. It is also important to note that the static head caused by tank 10 being located above filling machine 12 will not affect the system since the pump acting against the restriction will insure a substantially constant pressure of beer in line 16 between the pump and the restriction. Consequently, there is no chance of an air pocket being entrained in the beer being transferred and, thus, there will be no undesirable foaming causing a "wild" condition in the beer.

To further eliminate foaming of the beer prior to entry into filling machine 12, an air operated shut-off valve 38 is provided in the high pressure portion of beer delivery line 16 adjacent restriction 36. In other words, by locating the beer shut-off valve 38 on the high pressure side of restriction 36 rather than on the low pressure side, there will be no necessity of regulation and, thus, foaming due to regulation in the low pressure line entering the filler is eliminated. Shut-off valve 38, which is shown in an enlarged scale on the schematic drawing, will serve to trap the established high pressure in the line between pump 20 and restriction 36 when the pump is inoperative. As clearly shown in the drawing, beer shut-off valve 38 is provided with a valve operating member 40 which is actuated to the closed position by air on the upper side of a diaphragm 42. The air is supplied from a suitable source through conduit 44, an air pressure regulator 46 and a solenoid operated air valve 48. An inlet air pressure gauge 50 is provided on the inlet side of regulator 46 while an air regulator pressure gauge 52 is mounted in line 44 on the outlet side of air pressure regulator 46.

Solenoid operated valve 48 is electrically connected in parallel to relay 28. Consequently, when the switches 32 and 26 are closed and a circuit is completed through the relay to cause the magnetic starter switches 30 to close and, thus, operate the electric motor 22, current will be supplied to solenoid operated valve 48 and, thus, energize the solenoid to close valve 48 so that air pressure will not be applied to the top of diaphragm 42 in beer shut-off valve 38. The valve member 40 will then open. When the beer in reservoir 24 has risen to a predetermined level, switch 26 will open and the starting circuit will be de-energized. Likewise, the solenoid valve 48 will de-energize and open, permitting air delivered through line 44 to be applied to the top of diaphragm 42. The air pressure on top of diaphragm 42 will cause valve member 40 to close so that the pressure of beer developed in line 16 between the restriction 36 and check valve 35 of the pump 20 will be trapped and maintained constant. This feature of the invention is important from the standpoint of eliminating an unstable condition in the beer as it enters the filling machine when the system is started. If the pressure of beer in line 16 is not maintained at the constant pressure established therein, when pump 20 is started again, the build up of pressure in line 16 due to the pump acting against restriction 36 will cause foaming. Therefore, as previously mentioned, an important feature of the present invention is the provision of a beer shut-off valve adjacent restriction 36 to trap beer in line 16 at the established high pressure when the motor or pump 20 is inoperative, as this will provide uniform operation throughout a working day.

In starting of pump 20 from a standing position, a momentary surge of 15 to 25 pounds pressure above the normal operating pressure of 20 to 30 pounds in beer delivery line 16 is produced between the pump and filling machine 12. As soon as the beer begins to move in line 16 the pressure will drop to the normal operating pressure of 20 to 30 pounds. This momentary pressure increase or surge in beer line 16 is harmful in that it causes a "wild" condition in the beer when the pressure of the beer is reduced to the normal operating pressure. In other words, the beer will become unstable, resulting in a harmful condition at the filling machine, thus, decreasing the efficiency of filling. To eliminate this undesirable condition, a surge tank 56 is provided adjacent pump 20 and will absorb any increase in pressure of beer in line 16 until the beer starts moving therein.

Surge tank 56 is an enclosed tank which is pressurized at approximately one pound higher than the running pressure in beer line 16 between the filler and pump 20. A relief valve 59 is provided on surge tank 56 and is set so that the pressure in the tank will be relieved if there is a tendency to increase above the desired pressure. To pressurize surge tank 56, a gas line 58 is connected to the top of the tank and is provided with a regulator 60. A suitable gauge 62 is provided on the outlet side of surge tank regulator 60 so that the operator can determine whether the surge tank is being properly pressurized. Line 58 may be connected to the same source of gas that is used to counter-pressure or to superpose the liquid in the filling machine. In other words, the source of carbon dioxide gas which is used for counter-pressuring the bottles being filled or for superposing the beer in reservoir 24 can be used to pressurize tank 56 so that a separate source of gas is not needed. The inlet of surge tank 56 is connected to the outlet of pump 20 by means of a pipe or conduit 64 whereas the outlet of the surge tank is connected to conduit 16 on the inlet side of pump 20 by a pipe or conduit 66. When there is a momentary surge of pressure in the conduit 16, the beer will flow through line 64 into surge tank 56 where it will be stored until the level in surge tank 56 reaches a predetermined height. Then the beer in surge tank 56 will be returned to the system through line 66 to the inlet side of pump 20. At this point, it is well to mention that by providing a carbon dioxide gas as a means of pressurizing the surge tank 56, the beer therein will not become stale or "flat" because the carbon dioxide gas in the beer will not be released into the carbon dioxide atmosphere within the surge tank, To control the flow of beer out of pressurized surge tank 56, a high level switch 68 and a low level switch 70 are provided. A float 72 actuates the switches 68 and 70 to open and close a solenoid operated valve 74 in conduit 66. More particularly, when float 72 rises due to an increase in level of beer in tank 56 it will first close low level switch 70 and then close high level switch 68. When high level switch 68 is closed, a relay 76 is energized, closing the magnetic switches 78 and 80. When magnetic switch 80 closes, the circuit to the solenoid operated valve 74 is energized opening the valve and permitting beer to flow in the line 66. Beer will flow from surge tank 56 to the inlet side of pump 20 because the pressure in the surge tank is higher than the pressure on the inlet side of the pump. Since the level of liquid will immediately drop in tank 56, switch 68 will open but a holding circuit through low level switch 70 will maintain the relay 76 energized, permitting valve 74 to remain open. After the level of liquid in tank 56 has dropped to a predetermined low level, the flat 72 will open switch 70 breaking the holding circuit and, open magnetic switches 78 and 80. Valve 74 will then close, stopping the flow of beer into line 16 on the inlet side of pump 20.

The operation of the system is as follows: When it is desired to operate filling machine 12, the manually operated starter switch 32 is closed. If the beer in the reservoir 24 of filling machine 12 is below a predetermined height for filling, a float valve (not shown) will actuated a valve (not shown) to permit gas in the top of reservoir 24 to flow through the line 27 to switch 26 whereby it is actuated to the closed position. Pump 20 will then start and shut-off valve 38 will open to allow flow of beer into the filling machine. The beer previously trapped in line 16 will not immediately move therein and there will be a momentary surge of pressure. However, the beer causing the surge in pressure will be absorbed in the pressurized surge tank 56 and, thus, there will be no increase in pressure of the beer in line 16 between pump 20 and restriction 36 while the beer is starting to flow to reservoir 24.

In normal operation the operating cycle of beer pump 20 and motor 22 is two minutes on, with a two second off period, which provides an almost continuous operation. Since the pump 20 operates about ninety percent of the time during the course of an operating day, a good quantity of beer is received in surge tank 56 and, therefore, the physical size of the surge tank must be in proportion so that the surge tank does not unload more than eight times in an eight hour day. In other words, the surge tank will receive a substantial supply of beer before the level therein will raise the float to close the low and high level switches 68 and 70 whereby the beer can be returned to the system. When pump 20 is inoperative, shut-off valve 38 will close, trapping beer in the line between the pump and restriction.

The terminology used in the specification is for the purpose of description and not for limitation as the scope of the invention is defined in the claims.

I claim:

1. A filling system of the class described comprising a storage tank having a carbonated liquid therein, a filling machine having a reservoir for receiving the carbonated liquid from said storage tank, said carbonated liquid in the reservoir being under a superposed body of gas at a predetermined pressure, fluid connecting means between said storage tank and the reservoir of said filling machine, said storage tank being located with respect to said reservoir so that the pressure of liquid in said fluid connecting means is normally equal to or less than the pressure of the liquid in said reservoir, and means for establishing a pressure in the liquid in said fluid connecting means higher than the pressure of the liquid in said storage tank and reservoir of said filling machine, said last mentioned means including a restriction having a rigidly defined flow bore in said fluid connecting means, said restriction being positioned adjacent said filling machine.

2. A filling system of the class described comprising a storage tank having a carbonated liquid therein, a filling machine having a reservoir for receiving the carbonated liquid from said storage tank, said carbonated liquid in the reservoir being under a superposed body of gas at a predetermined pressure, fluid connecting means between said storage tank and the reservoir of said filling machine, a pump for transferring the carbonated liquid in said storage tank through said fluid connecting means to the reservoir of said filling machine, and a restriction having a rigidly defined flow bore in said fluid connecting means intermediate said pump and said reservoir, said restriction establishing a higher and substantially constant pressure in the carbonated liquid in said fluid connecting means between said pump and the restriction than in the reservoir of said filling machine.

3. A filling machine of the character described in claim 2 including means to prevent reverse flow of liquid through said pump, and a valve in said fluid connecting means positioned immediately adjacent said restriction and intermediate said pump and said restriction, said valve operative to a closed position when said pump is inoperative whereby the pressure of the carbonated liquid in said fluid connecting means is trapped at a higher pressure than the pressure of liquid in said reservoir when no liquid is being transferred.

4. A filling system of the class described comprising a storage tank having a carbonated liquid therein, a filling machine having a reservoir for receiving the carbonated liquid from said storage tank, said carbonated liquid in said reservoir being under a superposed body of gas at a predetermined pressure, fluid connecting means between said storage tank and the reservoir of said filling machine, a pump for transferring the carbonated liquid in said storage tank through said fluid connecting means to the reservoir of said filling machine, means to prevent reverse flow of liquid through said pump, means dependent upon the level of liquid in said reservoir for operating said pump, a restriction in said fluid connecting means intermediate said pump and said reservoir, said restriction establishing a higher pressure in the carbonated liquid in said fluid connecting means between said pump and the restriction than in the reservoir of said filling machine, a shut-off valve positioned adjacent said restriction and intermediate said pump and restriction, said shut-off valve being open when said pump is operating and means operable by said pump operating means to actuate said valve to the closed position when said pump is stopped whereby the higher pressure of liquid established in said fluid connecting means is trapped between said pump and said valve.

5. A system of the character described in claim 4 wherein said valve is an air operated shut-off valve and wherein said valve operating means is a solenoid valve controlling the amount of air to said air actuated shut-off valve.

6. In a filling system for a carbonated liquid, a filling machine having a reservoir for a body of the liquid and a superposed body of gas, a storage tank for a supply of the liquid, means for delivering the liquid to said reservoir from said storage tank at a substantially constant pressure including a pump, means dependent upon the level of liquid in said reservoir for operating said pump to deliver liquid thereto, and means connected to said liquid delivery means for absorbing liquid pressure surges therein when said pump is started, said last mentioned means including a surge tank having its inlet and outlet connected to the outlet and inlet respectively of said pump.

7. A filling system of the character described in claim 6 including means dependent upon the level of liquid in said surge tank for returning the liquid therein to the inlet of said pump.

8. In a filling system for a carbonated liquid, a filling machine having a reservoir for a body of liquid and a superposed body of gas, the liquid in said reservoir being subjected to a predetermined pressure by the superposed body of gas, a storage tank for a supply of the liquid, means for delivering liquid to said reservoir from said storage tank at a substantially constant pressure including a pump, means dependent upon the level of liquid in said reservoir for operating said pump, and a surge tank having its inlet and outlet connected to the outlet and inlet respectively of said pump, said surge tank being capable of absorbing liquid pressure surges in said liquid delivery means above the pressure of the liquid in said reservoir when said pump is started.

9. In a filling system for a carbonated liquid, a filling machine having a reservoir for a body of the liquid and a superposed body of gas, the liquid in said reservoir being subjected to a predetermined pressure by the superposed body of gas, a storage tank for a supply of the liquid, fluid connecting means between said storage tank and said reservoir, means connected to said fluid connecting means for delivering the liquid therethrough from said storage tank at a predetermined pressure higher than the pressure of the liquid in said reservoir and including a restriction and a pump, means dependent on the level of liquid in said reservoir for operating said pump, a pressurized surge tank having its inlet and outlet connected to the outlet and inlet respectively of said pump, said surge tank being capable of absorbing pressure surges of the liquid in said fluid connecting means above the predetermined pressure of liquid therein when said pump is started.

10. A filling system of the character described in claim 9 wherein said surge tank is provided with a solenoid operated valve in its outlet, said valve being energized to the open position when the liquid in said surge tank has reached a predetermined level whereby the liquid is returned to the system.

11. A filling system of the character described in claim 10 wherein said solenoid operated valve is closed upon a drop of liquid in said surge tank below a predetermined level.

12. In a filling system for a carbonated liquid, a filling machine having a reservoir for a body of the liquid and a superposed body of gas, the liquid in said reservoir being subjected to a predetermined pressure by the superposed body of gas, a storage tank for a supply of the liquid, fluid connecting means between said storage tank and said reservoir, a pump connected to said fluid connecting means for delivering liquid therethrough from said storage tank to said reservoir, a restriction in said fluid connecting means between said pump and said reservoir, said restriction creating a higher pressure in the liquid being delivered through said fluid connecting means than the pressure of liquid in said reservoir, means dependent on the level of liquid in said reservoir for operating said pump, a pressurized surge tank having its inlet and outlet connected to the outlet and inlet of said pump, said surge tank being capable of absorbing momentary liquid pressure surges in said fluid connecting means between said restriction and said pump when said pump is started, and means connected to the outlet of said surge tank for controlling the return of liquid in said surge tank to the system, said last-mentioned mean being dependent upon the level of liquid in said surge tank.

13. A filling system of the character described in claim 12 wherein said surge tank is pressurized by a carbon dioxide gas.

14. A filling system of the class described comprising a storage tank having a carbonated liquid therein, a filling machine having a reservoir for receiving the carbonated liquid from said storage tank, said carbonated liquid in the reservoir being under a superposed body of gas at a predetermined pressure, a pump having its inlet connected to said storage tank, and a non-fluctuating restriction having its inlet connected to the outlet of said pump and its outlet connected to the inlet of said filling machine, said pump cooperating with said restriction to establish a flow of liquid from the pump to the restriction at a substantially constant pressure.

15. A filling system of the character described in claim 14 including means to maintain the pressure of liquid between the pump and said restriction substantially constant when the pump is inoperative.

References Cited in the file of this patent

UNITED STATES PATENTS

| | | |
|---|---|---|
| 686,341 | Rockwood | Nov. 12, 1901 |
| 1,657,112 | Doughty | Jan. 24, 1928 |
| 2,015,765 | Strutzel | Oct. 1, 1935 |
| 2,033,032 | Jennings | Mar. 3, 1936 |
| 2,168,059 | Buttner | Aug. 1, 1939 |
| 2,331,435 | Stambaugh | Oct. 12, 1943 |
| 2,660,360 | Gricar et al. | Nov. 24, 1953 |